United States Patent
Ichimura

(10) Patent No.: US 8,346,001 B2
(45) Date of Patent: Jan. 1, 2013

(54) IMAGE PROCESSING APPARATUS, PRINTING APPARATUS, AND IMAGE PROCESSING METHOD

(75) Inventor: Akira Ichimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 12/485,363

(22) Filed: Jun. 16, 2009

(65) Prior Publication Data
US 2009/0317004 A1    Dec. 24, 2009

(30) Foreign Application Priority Data
Jun. 20, 2008   (JP) ................................. 2008-162405

(51) Int. Cl.
    *G06K 9/00* (2006.01)
(52) U.S. Cl. ....................................... 382/252; 358/3.03
(58) Field of Classification Search ........................ None
    See application file for complete search history.

(56) References Cited

U.S. PATENT DOCUMENTS

| | | | | |
|---|---|---|---|---|
| 4,955,065 A * | 9/1990 | Ulichney | ....................... | 382/270 |
| 5,313,287 A * | 5/1994 | Barton | .......................... | 382/252 |
| 5,329,380 A * | 7/1994 | Ishida | .......................... | 358/3.03 |
| 5,627,659 A * | 5/1997 | Kakutani | ...................... | 358/443 |
| 5,931,960 A * | 8/1999 | Kletter et al. | .................. | 714/704 |
| 5,953,459 A * | 9/1999 | Ueda et al. | ..................... | 382/237 |
| 6,307,647 B1 * | 10/2001 | Cheung et al. | ................ | 358/3.04 |
| 6,390,586 B1 * | 5/2002 | Takahashi et al. | .............. | 347/19 |
| 6,693,727 B1 * | 2/2004 | Kanno et al. | .................. | 358/3.03 |
| 7,236,269 B2 * | 6/2007 | Donovan et al. | .............. | 358/3.22 |
| 7,486,834 B2 * | 2/2009 | Bailey et al. | .................. | 382/252 |
| 7,884,969 B2 * | 2/2011 | Takemura et al. | ........... | 358/3.03 |
| 7,940,427 B2 * | 5/2011 | Takemura et al. | ........... | 358/3.03 |
| 2001/0021275 A1 * | 9/2001 | Nose | .............................. | 382/252 |
| 2003/0112468 A1 * | 6/2003 | Eschbach et al. | ............. | 358/3.03 |
| 2003/0214677 A1 | 11/2003 | Bhaskar et al. | | |
| 2006/0158692 A1 * | 7/2006 | Bailey et al. | .................. | 358/3.03 |
| 2007/0223043 A1 | 9/2007 | Sugimoto | | |
| 2008/0137145 A1 * | 6/2008 | Takemura et al. | ........... | 358/3.03 |

FOREIGN PATENT DOCUMENTS

| | | |
|---|---|---|
| JP | 03-151762 A | 6/1991 |
| JP | 6-125434 A | 5/1994 |
| JP | 3410122 B2 | 5/2003 |

OTHER PUBLICATIONS

European Office Action issued in corresponding application No. 09008009.4 dated Jul. 6, 2011—7 pages.

\* cited by examiner

*Primary Examiner* — Chan S Park
*Assistant Examiner* — Sean Motsinger
(74) *Attorney, Agent, or Firm* — Fitzpatrick, Cella, Harper & Scinto

(57) ABSTRACT

This invention is directed to efficiently compressing data used in an image process for an unprocessed line adjacent to a process line in an image data process for each line, and reducing the memory band. To accomplish this, processed image data is compressed, and it is determined whether the process direction of image data of the next line is the first direction or the second direction opposite to the first direction. The data organization of the compressed image data is changed in accordance with the determination result. A memory stores the compressed image data whose data organization has been changed. The compressed image data stored in the memory is read out and decompressed. An image process is performed using the decompressed image data and image data of a line adjacent to the line of the processed image data.

7 Claims, 16 Drawing Sheets

F I G. 16
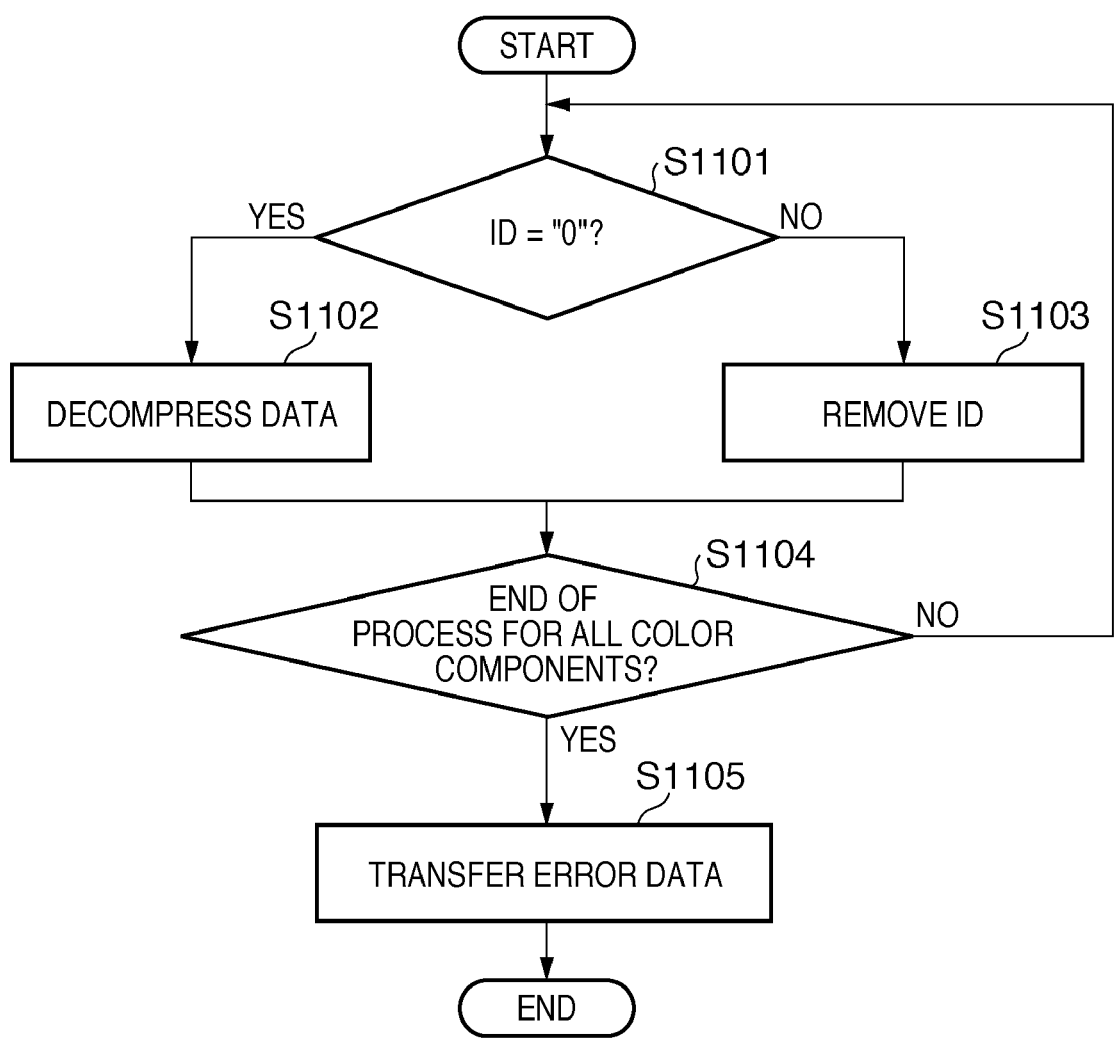

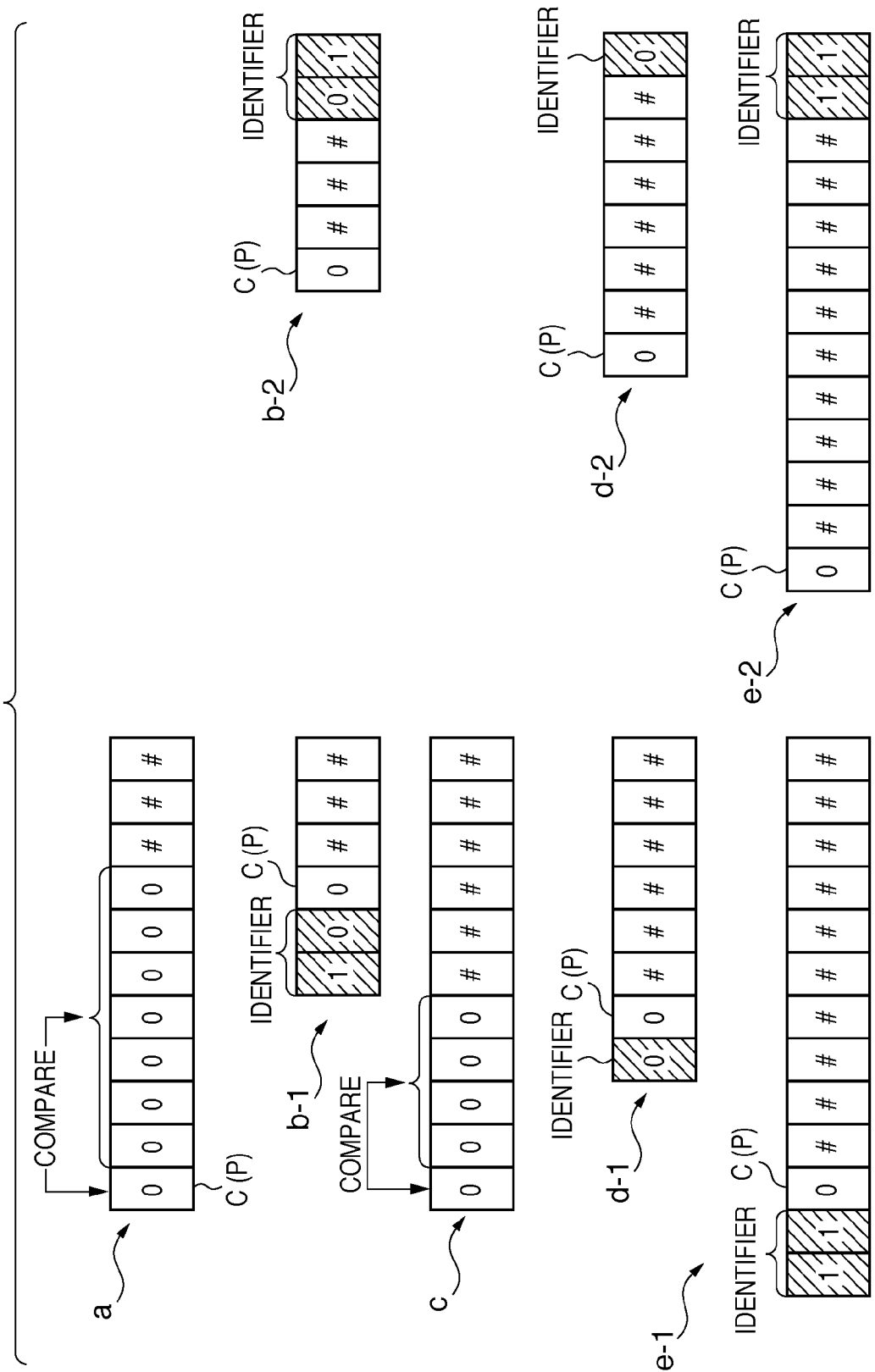

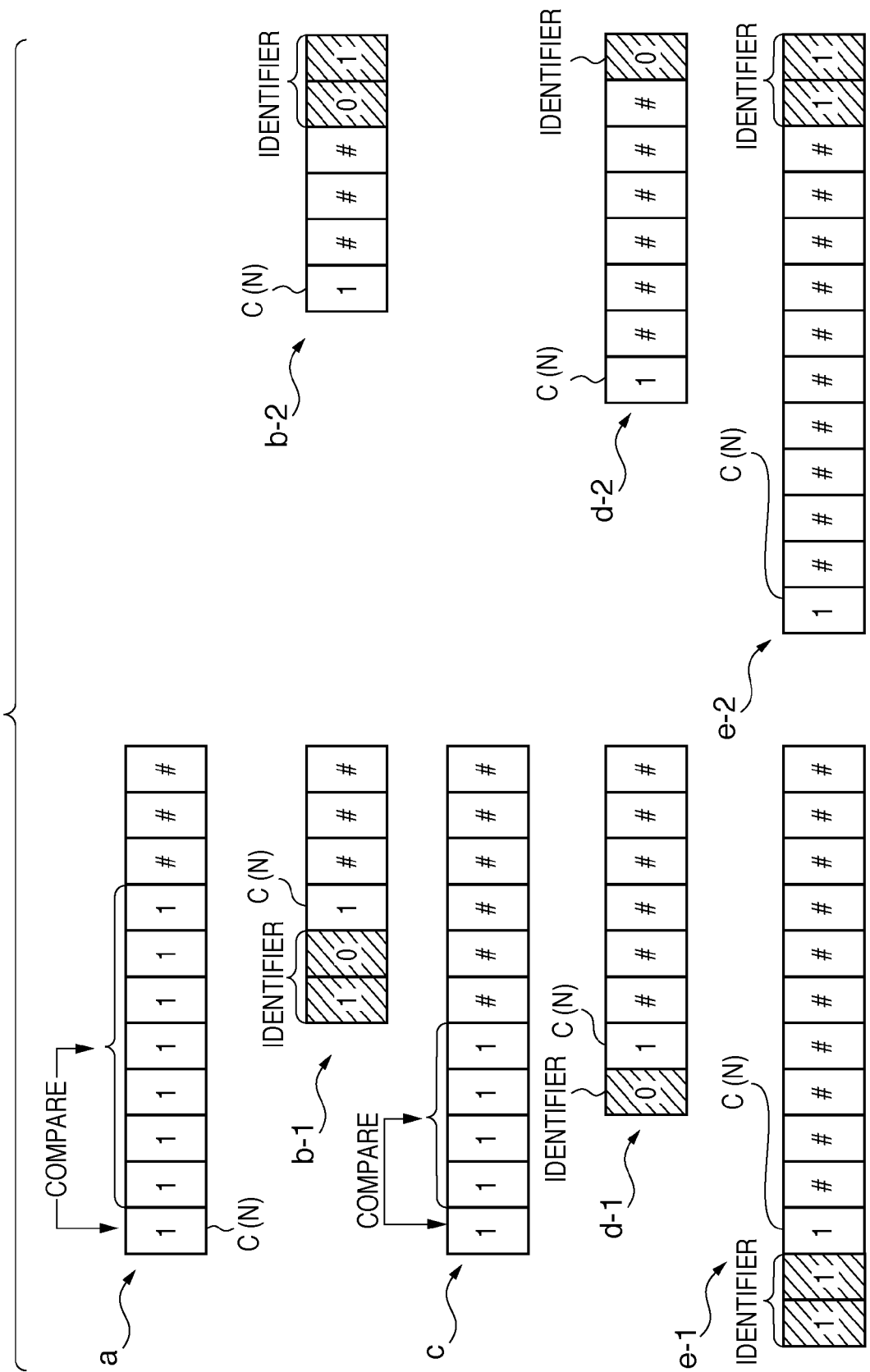

IMAGE PROCESSING APPARATUS, PRINTING APPARATUS, AND IMAGE PROCESSING METHOD

BACKGROUND OF THE INVENTION

1. Field of the Invention

The present invention relates to an image processing apparatus, printing apparatus, and image processing method. Particularly, the present invention relates to an image processing apparatus, printing apparatus, and image processing method capable of performing a data process for each line in bi-directions, and efficiently compressing/decompressing data to be used in an image process on adjacent lines.

2. Description of the Related Art

In these days, OA devices such as a personal computer (PC), copying machine, and wordprocessor have become popular. As a kind of image forming (printing) apparatus for these devices, an apparatus which performs digital image printing by an inkjet method has been rapidly developed and prevailed. The OA devices are required for providing more advanced functions, and printing an image in color. To meet this demand, various color inkjet printing apparatuses have been developed.

An inkjet printing apparatus generally includes a carriage which supports a printhead and ink tank, a conveyance unit which conveys printing paper, and a controller which controls them. The inkjet printing apparatus performs printing operation by scanning a printhead for discharging ink droplets from a plurality of orifices in a direction (main scanning direction) perpendicular to the printing paper conveyance direction (sub-scanning direction), while intermittently conveying printing paper by a distance corresponding to the print width during a non-printing period. A color inkjet printing apparatus forms a color image by superposing ink droplets of a plurality of colors discharged from a plurality of printheads.

According to the inkjet printing method, a character, figure, and the like are printed by discharging small ink droplets from orifices onto a printing medium in accordance with a print signal. This printing method is advantageous because it is non-impact printing which hardly generates noise, its running cost is low, and it can easily downsize the apparatus and easily print in color. For this reason, the inkjet printing method is widely applied to an image forming (printing) means in a printing apparatus such as a copying machine, printer, or facsimile apparatus, that is used alone or together with a computer or wordprocessor.

In general, color inkjet printing implements color printing using inks of four colors, that is, three, cyan (C), magenta (M), and yellow (Y) color inks and a black (Bk) ink. Recent available color inkjet printing improves graininess, tonality, and color reproducibility by adding low-density inks of light cyan and light magenta, and special color inks of red and green to the four color inks.

Raster image data such as RGB multi-valued image data based on image information input from a host PC undergo color conversion such as CSC or gamma correction, and are converted into multi-valued data formed from the components of ink colors (e.g., Bk, C, M, and Y). The multi-valued data are converted into binary data for each ink color by pseudo halftoning using an error diffusion method or dithering method. In this manner, multi-valued image data are converted into data (binary data in this case) outputtable from a printhead.

Dithering has a trade-off between resolution and tonality owing to its feature. For example, higher tonality requires a larger dither matrix, which decreases the resolution. The error diffusion method can increase resolution and tonality, but has intrinsic problems. For example, a chain of dots or a chain of unprinted portions appears, and an unintended streak appears regularly. To solve these problems, for example, Japanese Patent Laid-Open No. 3-151762 discloses a method of switching the process direction of error diffusion between lines so as not to fix the error diffusion direction. This method can increase resolution and tonality, and solve poor image quality owing to error diffusion. As a result, high quality image data outputtable to a printhead can be generated.

The error diffusion method requires an error memory for storing an error to be diffused to the next line in every line process, in order to diffuse an error to a pixel other than one on the same line as that of a process pixel. An error to be diffused to the next line according to the method of switching the process direction of error diffusion is generated in the same direction as the process direction, and stored in the error memory.

A bandwidth requirement for a error memory causes many problems. The first serious problem is influence on pseudo halftoning performance. Access to the error memory requested of a high bandwidth may result in bottleneck for satisfactory pseudo halftoning performance. The second serious problem is influence over the entire system. In some systems, a memory necessary for another data process and system control and a system memory are physically shared to reduce the production cost of the overall apparatus. In such a system, frequent access to the error memory space adversely affects another image data process and the system operation.

Note that a high memory bandwidth requirement for frequent data input/output access during an image data process is not an issue specific to a quantization process. The high memory bandwidth requirement is an issue for many image data processes such as various filtering processes, resolution conversion, compression/decompression, color conversion/correction, and rasterization.

There is also proposed a method of compressing data in an image process which changes the data process direction. Japanese Patent No. 3410122 discloses a method of compressing data, storing the compressed data in a memory, and creating decompressed data while changing the data read-out method depending on whether to rotate the data by 180°. According to this method, data array in a right-left direction and upper-lower direction need to be swapped depending on whether to rotate the data.

This conventional method, however, requires a very high memory band to process a high-resolution image at high speed.

For example, when 12 bits represent generated error data considering correction control using a threshold and diffusion coefficient, the memory needs to have a capacity of the number of pixels of one raster×12 bits for each ink color. For example, when diffusing an error to the same line as that of a process pixel and a line below it, a memory capacity corresponding to six ink colors, a 1,200-dpi resolution, and a 24" maximum print width is 6 colors×24"×1200 dpi×12 bits×1 line=260 Kbytes.

When a system LSI serving as the control center of the overall system internally implements an image data process including pseudo halftoning, the cost may rise if the error memory is formed from an SRAM incorporated in the LSI. To prevent this, the error memory desirably shares a system memory externally connected to the system LSI. When giving attention to processing a pixel of interest, one read access and one write access of error data occur for one color. In processing six colors, the error memory needs to be accessed a total of 12 times. To perform a 2-cycle process per pixel at an operating frequency of 200 MHz, the requested memory band becomes as very high as 200 MHz/2×12 times×12 bits=1.8 Gbytes/sec.

A diffused error may also be stored in the memory after compression in order to reduce the memory band. In this case, the direction of the error diffusion process is arbitrarily switched between lines, so a mechanism of determining the necessity of swapping compressed data in decompression is indispensable.

SUMMARY OF THE INVENTION

Accordingly, the present invention is conceived as a response to the above-described disadvantages of the conventional art.

For example, an image processing apparatus and method, and a printing apparatus using the apparatus according to this invention are capable of switching the process direction between lines, and efficiently compressing data corresponding to an unprocessed line adjacent to a process line to reduce the memory band.

According to one aspect of the present invention, there is provided an image processing apparatus which processes image data with a line format for each line, comprising: compression means for compressing processed image data; determination means for determining whether a process direction of image data of a next line is a first direction or a second direction opposite to the first direction; change means for changing, in accordance with a determination result of the determination means, a data organization of the image data compressed by the compression means; a memory which stores the compressed image data whose data organization has been changed by the change means; decompression means for reading out the compressed image data stored in the memory and decompressing the compressed image data; and image processing means for performing an image process using the image data decompressed by the decompression means and image data of a line adjacent to a line of the processed image data.

According to another aspect of the present invention, there is provided a printing apparatus using the above-mentioned image processing apparatus, comprising an inkjet printhead which prints on a printing medium by discharging inks of a plurality of colors.

According to still another aspect of the present invention, there is provided an image processing method of processing image data with a line format for each line, comprising: a compression step of compressing processed image data; a determination step of determining whether a process direction of image data of a next line is a first direction or a second direction opposite to the first direction; a change step of changing, in accordance with a determination result of the determination step, a data organization of the image data compressed in the compression step; a storage step of storing, in a memory, the compressed image data whose data organization has been changed in the change step; a decompression step of reading out the compressed image data stored in the memory and decompressing the compressed image data; and an image processing step of performing an image process using the image data decompressed in the decompression step and image data of a line adjacent to a line of the processed image data.

The invention is particularly advantageous since data used in an image process for an unprocessed line adjacent to a process line can be efficiently compressed in an image process for each line, reducing access to the memory for storing the data.

Further features of the present invention will become apparent from the following description of exemplary embodiments with reference to the attached drawings.

BRIEF DESCRIPTION OF THE DRAWINGS

FIG. 16 is a flowchart showing an error data decompression process according to the first embodiment of the present invention.

FIG. 18 is a conceptual view showing the compression format of error data according to the second embodiment of the present invention.

FIG. 19 is a conceptual view showing the compression format of error data according to the second embodiment of the present invention.

DESCRIPTION OF THE EMBODIMENTS

Exemplary embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Furthermore, unless otherwise stated, the term "printing element (nozzle)" generally means a set of a discharge orifice, a liquid channel connected to the orifice and an element to generate energy utilized for ink discharge.

<General Description of Inkjet Printing Apparatus Main Body (FIGS. 1 and 2)>

Figure 1:
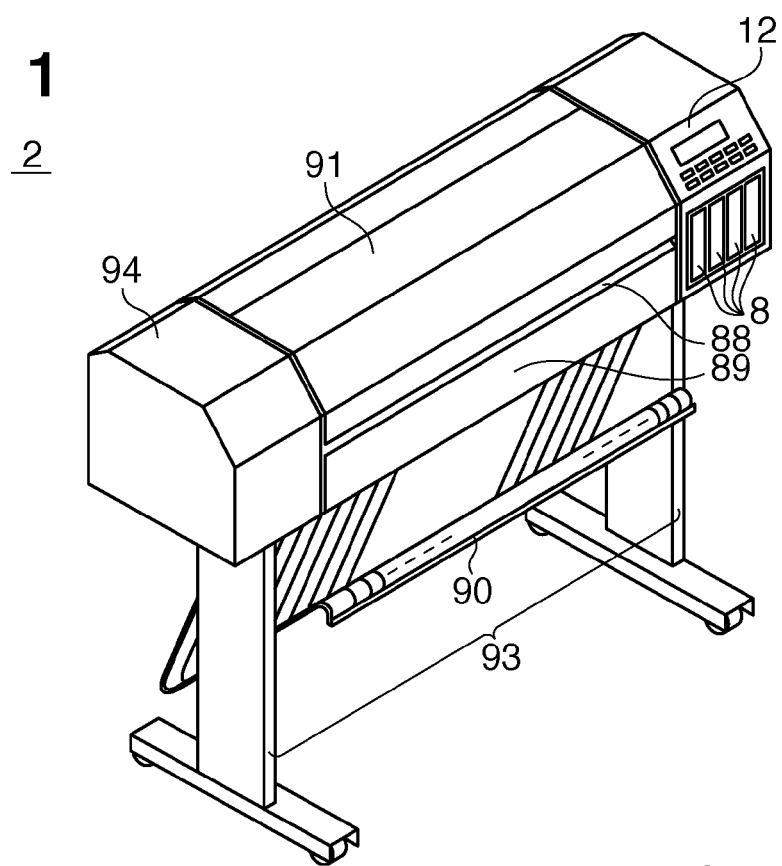
FIGS. 1 and 2 are perspective views showing the outer appearance of an inkjet printing apparatus.
Figure 2:
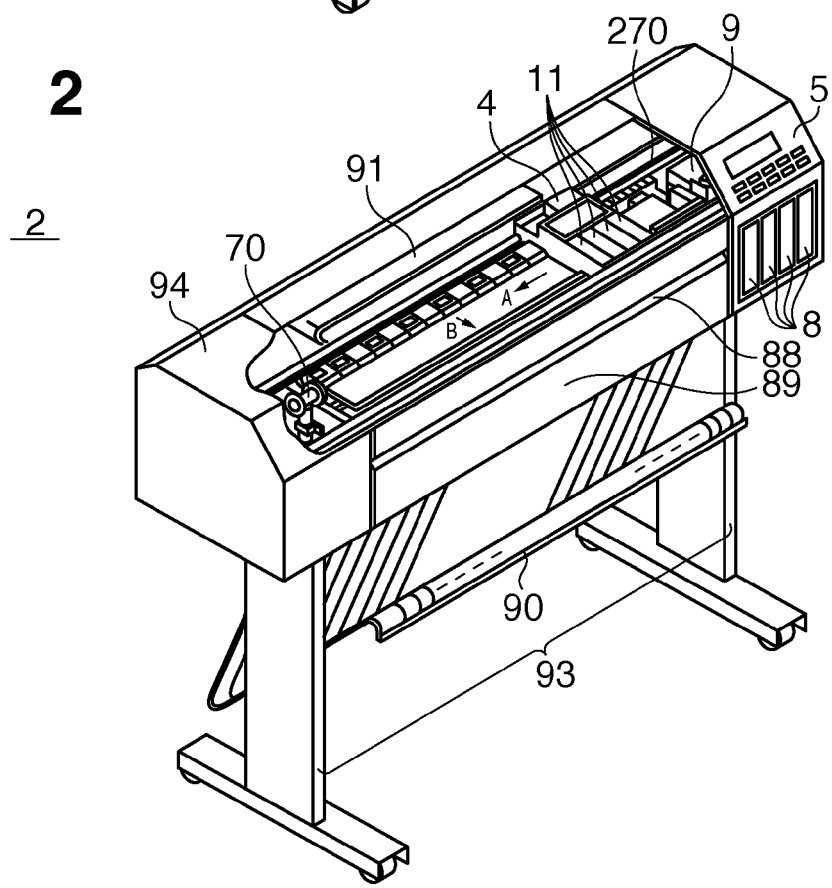

FIG. 1 is a perspective view showing the outer appearance of an inkjet printing apparatus (to be referred to as a printing apparatus) as a typical embodiment of the present invention. FIG. 2 is a perspective view showing a state in which the upper cover of the inkjet printing apparatus shown in FIG. 1 is removed.

As shown in FIGS. 1 and 2, an inkjet printing apparatus (to be referred to as a printing apparatus) 2 has a manual feed port 88 on its front surface, and a roll paper cassette 89 which can open to the front side is arranged below the manual feed port 88. A printing medium such as printing paper is supplied from the manual feed port 88 or roll paper cassette 89 into the printing apparatus. The inkjet printing apparatus includes an apparatus main body 94 supported by two legs 93, a stacker 90 which holds discharged printing media, and an openable see-through upper cover 91. An operation panel 12 and ink supply units 8 are arranged on the right side of the apparatus main body 94. A control unit 5 is arranged on the back side of the operation panel 12.

The printing apparatus 2 having this arrangement can print a large image of a poster size such as A0 or B0.

As shown in FIG. 2, the printing apparatus 2 includes a conveyance roller 70 for conveying a printing medium in a direction (sub-scanning direction) indicated by an arrow B, and a carriage unit (to be referred to as a carriage) 4 which is guided and supported to be able to reciprocate in directions (indicated by an arrow A: main scanning direction) of the printing medium width. The carriage 4 receives a driving force from a carriage motor (not shown) via a carriage belt (to be referred to as a belt) 270, and reciprocates in the directions of the arrow A. An inkjet printhead (to be referred to as a printhead) 11 is mounted on the carriage 4. A recovery unit 9 cancels an ink discharge failure caused by clogging of the orifice of the printhead 11 or the like.

In this printing apparatus, the carriage 4 supports the printhead 11 made up of four heads corresponding to four color inks, in order to print in color on a printing medium. More specifically, the printhead 11 is formed from a K (black) head for discharging K ink, a C (Cyan) head for discharging C ink, an M (Magenta) head for discharging M ink, and a Y (Yellow) head for discharging Y ink. In this structure, the ink supply units 8 incorporate four ink tanks storing K, C, M, and Y inks, respectively.

When printing on a printing medium by this arrangement, the conveyance roller 70 conveys a printing medium to a predetermined print start position. Then, the carriage 4 scans the printhead 11 in the main scanning direction, and the conveyance roller 70 conveys the printing medium in the sub-scanning direction. These operations are repeated to print on the entire printing medium.

More specifically, the belt 270 and carriage motor move the carriage 4 in the directions of the arrow A shown in FIG. 2 to print on a printing medium. The carriage 4 then returns to a position (home position) where it stayed before scanning. The conveyance roller conveys the printing medium in the sub-scanning direction. The carriage scans again in the directions of the arrow A in FIG. 2, printing an image, character, or the like on the printing medium. After this operation is repeated to end printing on one printing medium, the printing medium is discharged into the stacker 90, completing printing on, for example, one A0-size printing medium.

Figure 3:
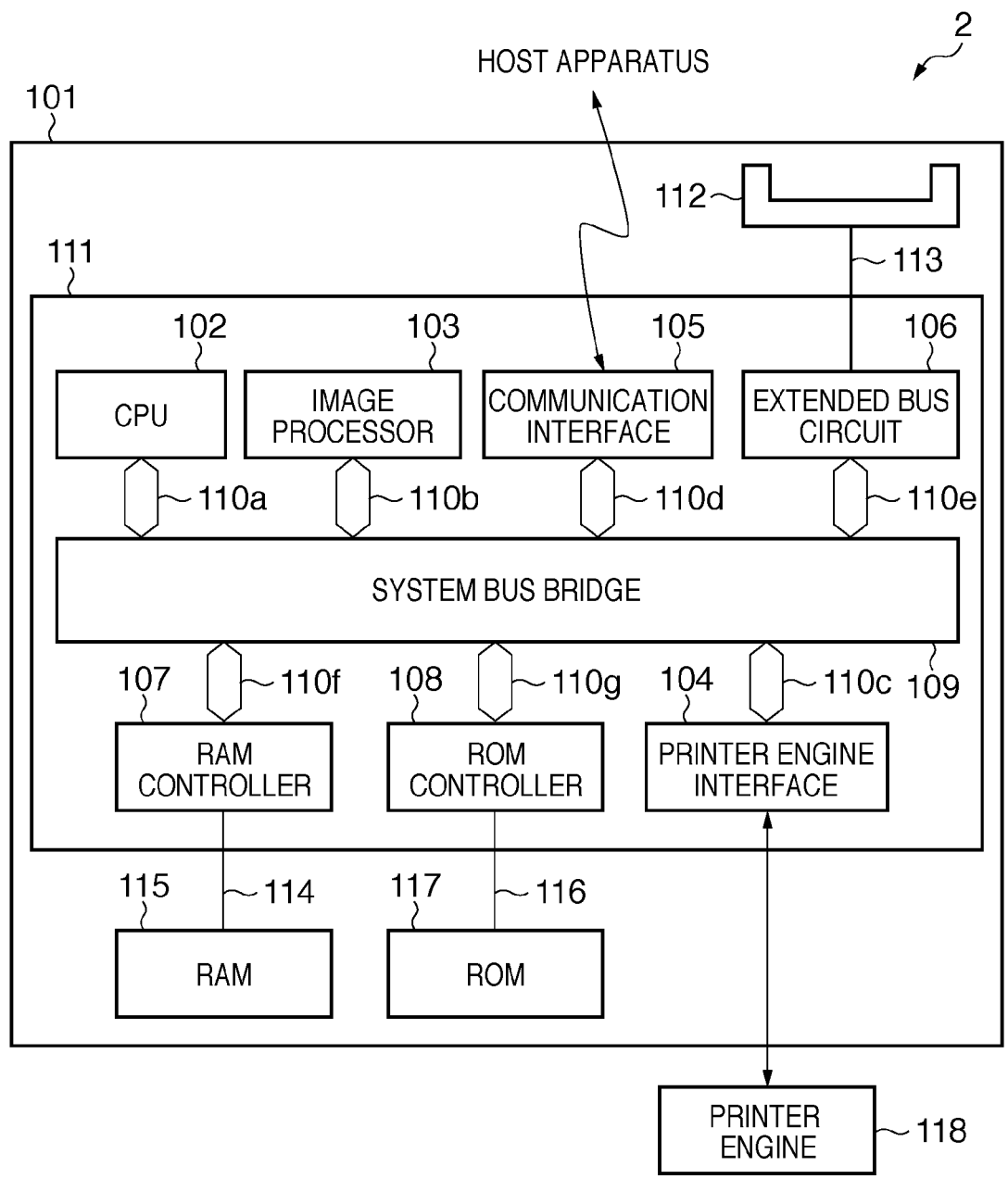
FIG. 3 is a schematic block diagram showing the control arrangement of the inkjet printing apparatus shown in FIGS. 1 and 2.

FIG. 3 is a block diagram showing the control arrangement of the printing apparatus.

As shown in FIG. 3, the printing apparatus 2 includes an image forming controller 101 and printer engine 118.

The image forming controller 101 provides a function of receiving a print instruction and print image data from a host apparatus such as a personal computer, converting the received image data into binary image data of a format printable by the printer engine 118, and outputting the binary image data. The image forming controller 101 includes a CPU 102, image processor 103, printer engine interface 104, communication interface 105, extended bus circuit 106, RAM controller 107, and ROM controller 108. These blocks are connected to a system bus bridge 109 via bus lines 110a to 110g, respectively. In the embodiment, these blocks are implemented as an image forming controller ASIC 111 sealed as a system LSI into one package.

The image forming controller 101 also includes an extended slot 112 for mounting a function extension unit, a RAM 115, and a ROM 117. In addition, the image forming controller 101 includes an operation unit and display unit shown in FIGS. 1 and 2, and a power supply circuit (not shown).

The CPU 102 controls the overall operations of the image forming controller 101. The CPU 102 reads out a control program stored in the ROM 117 or RAM 115, and executes it. The CPU 102 controls the image processor 103 to convert image data received from a host apparatus into image forming data serving as binary image data. The CPU 102 also controls the communication interface 105 to communicate with a host apparatus, and interprets a communication protocol. The communication interface 105 also controls the printer engine interface 104 to transfer image forming data generated by the image processor 103 to the printer engine 118.

The image processor 103 has a function of converting image data received from a host apparatus into binary image data printable by the printer engine 118. The detailed arrangement of the image processor 103 will be described with reference to the drawing.

The printer engine interface 104 allows the image forming controller 101 and printer engine 118 to transmit/receive data. The printer engine interface 104 includes a DMAC (Direct Memory Access Controller). The printer engine interface 104 sequentially reads out, via the RAM controller 107, binary image data which have been generated by the image processor 103 and stored in the RAM 115, and sequentially transfers them to the printer engine 118.

The communication interface 105 has a function of transmitting/receiving data to/from a host apparatus such as a personal computer or workstation. The communication interface 105 stores image data received from the host apparatus into the RAM 115 via the RAM controller 107. The communication interface 105 copes with various kinds of communication protocols such as high-speed serial communication (e.g., USB or IEEE1394), parallel communication (e.g., IEEE1284), and network communication (e.g., 100 BASE- TX). The communication interface 105 may cope with one of these communication protocols. The communication interface 105 may also be compliant not only with a wired communication protocol but also with a wireless communication protocol.

The extended bus circuit 106 has a function of controlling a function extension unit mounted in the extended slot 112. The extended bus circuit 106 controls to transmit data to the function extension unit via an extended bus 113, and controls to receive data output from the function extension unit. The extended slot 112 allows mounting a communication unit (e.g., USB, IEEE1394, IEEE1284, or network communication) which provides a function of communicating with a host apparatus, and a hard disk drive unit which provides a mass storage facility.

Note that each of the image processor 103, communication interface 105, and extended bus circuit 106 also includes a DMAC similarly to the printer engine interface 104, and has a function of issuing a memory access request.

The RAM controller 107 has a function of controlling the RAM 115 connected to the image forming controller ASIC 111 via a RAM bus 114. The RAM controller 107 relays data to be written or read out between the CPU 102, each block having the DMAC, and the RAM 115. The RAM controller 107 generates a necessary control signal in accordance with a read-out request or write request from the CPU 102 or each block, achieving write in the RAM 115 or read-out from it.

The ROM controller 108 has a function of controlling the ROM 117 connected to the image forming controller ASIC 111 via a ROM bus 116. The ROM controller 108 generates a necessary control signal in accordance with a read-out request from the CPU 102, reads out a program and data stored in advance in the ROM 117, and sends back the read-out contents to the CPU 102 via the system bus bridge 109. When the ROM 117 is formed from an electrically rewritable device such as a flash memory, the ROM controller 108 has a function of generating a necessary control signal and rewriting the contents of the ROM 117.

The system bus bridge 109 has a function of connecting the building blocks of the image forming controller ASIC 111, and a function of arbitrating the bus right when a plurality of blocks simultaneously issue access requests. In some cases, the CPU 102 and blocks having the DMAC almost simultaneously issue requests to access the RAM 115 via the RAM controller 107. In such a case, the system bus bridge 109 can appropriately arbitrate these access requests according to priority designated in advance.

The RAM 115 is formed from a synchronous DRAM or the like. The RAM 115 is a memory block which provides a function of temporarily storing a program to be executed by the CPU 102, a function of temporarily storing image forming data generated by the image processor 103, and a function of serving as a work memory and the like for the CPU 102. The RAM 115 also provides a function of temporarily buffering image data received from the host apparatus in the communication interface 105, and a function of temporarily saving data exchanged between function extension units connected via the extended bus 113.

The ROM 117 is formed from a flash memory or the like, and stores programs to be executed by the CPU 102 and parameters necessary for printer control. The flash memory is an electrically rewritable nonvolatile device. The ROM 117 allows rewriting programs and parameters in accordance with a predetermined sequence.

Each circuit block further includes a register for setting an operation mode or the like. The CPU 102 can set the operation mode of each circuit block via a register access bus (not shown).

The printer engine 118 is a printing mechanism which prints an image on a printing medium based on binary image data sent from the image forming controller 101.

In the embodiment, the printer engine 118 performs inkjet printing as described with reference to FIGS. 1 and 2. The printer engine 118 prints an image with six, cyan (C), magenta (M), yellow (Y), black (Bk), light cyan (LC), and light magenta (LM) color inks or four, C, M, Y, and Bk color inks.

The image processor 103 of the printing apparatus will be explained with reference to FIG. 4.

Figure 4:
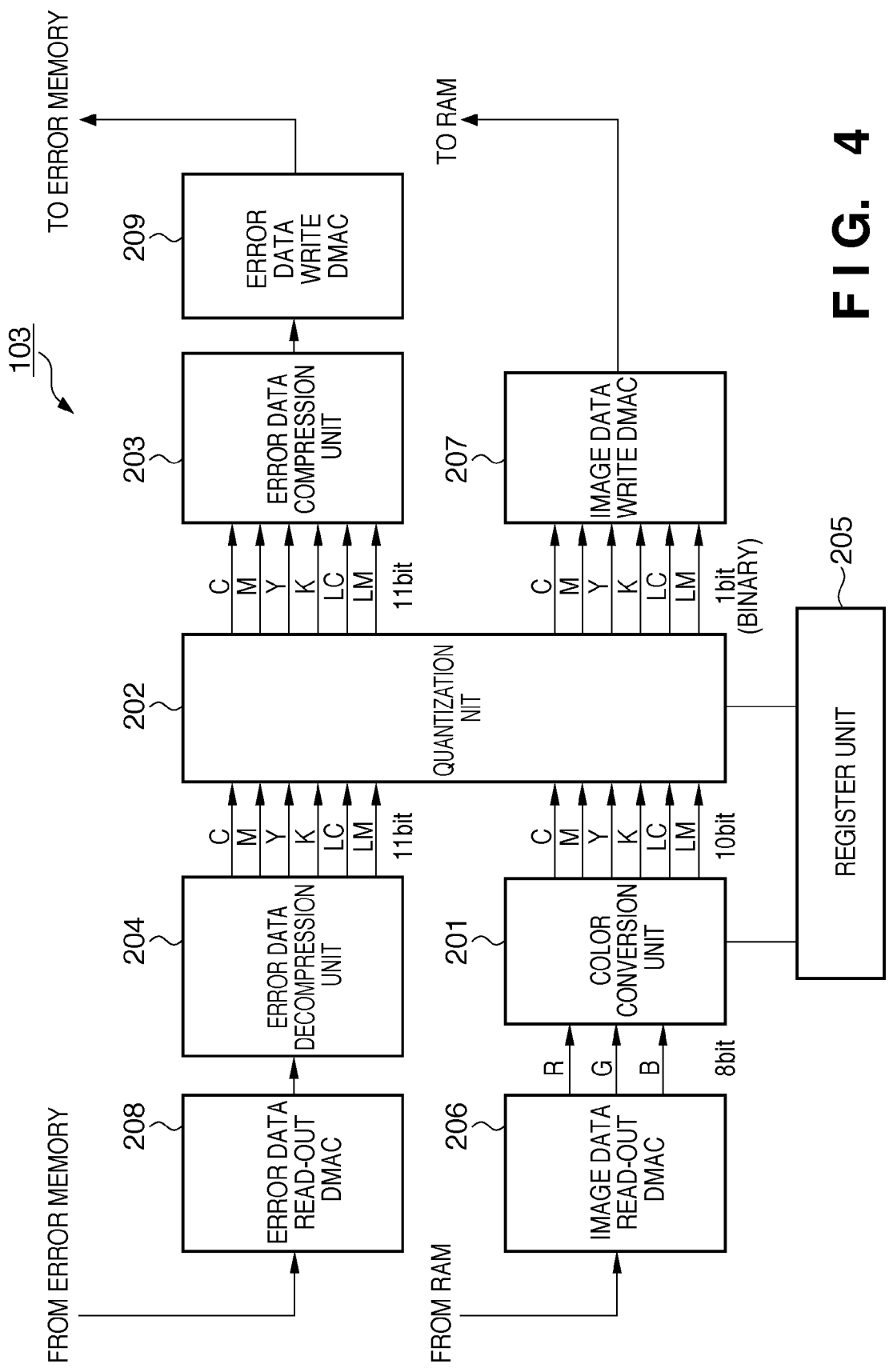
FIG. 4 is a functional block diagram showing the arrangement of an image processor.

FIG. 4 is a functional block diagram showing the detailed arrangement of the image processor 103.

The image processor 103 includes a color conversion unit 201, quantization unit 202, error data compression unit 203, error data decompression unit 204, register unit 205, image data read-out DMAC 206, and image data write DMAC 207. The image processor 103 further includes an error data read-out DMAC 208 and error data write DMAC 209.

The color conversion unit 201 converts the color space of multi-valued input image data of a line received from a host apparatus into a color space represented by the ink colors of the printer engine 118. In the embodiment, multi-valued image data from the host apparatus are color image data in which each pixel is represented by 8 bits of each of red (R), green (G), and blue (B). The color conversion unit 201 converts each pixel of input image data into a color space represented by 10 bits of each of C, M, Y, K, LC, and LM which are ink colors of the printer engine 118. The color conversion unit 201 also executes gamma correction corresponding to the output characteristic of the printer engine 118.

The quantization unit 202 performs a binarization process based on an error diffusion method for each color component. The quantization unit 202 performs the binarization process, that is, quantization process by adding an error diffused from a neighboring pixel to a pixel of interest and comparing the resultant value with a threshold. The quantization error generated in this process is diffused to unprocessed neighboring pixels to maintain the density of the entire image data.

The error data compression unit 203 compresses the amount of error data to be diffused to pixels on an adjacent line, out of an error to be diffused to unprocessed neighboring pixels by the quantization unit 202. The compressed error data is sent to the error data write DMAC 209 and stored in the error memory. The error data compression method of the printing apparatus according to the embodiment will be described later with reference to the drawings.

The error data decompression unit 204 decompresses error data (compressed image data) compressed by the error data compression unit 203 into original data. The error data decompression unit 204 receives compressed error data via the error data read-out DMAC 208, decompresses it, and transfers the decompressed error data to the quantization unit 202.

Figure 5:
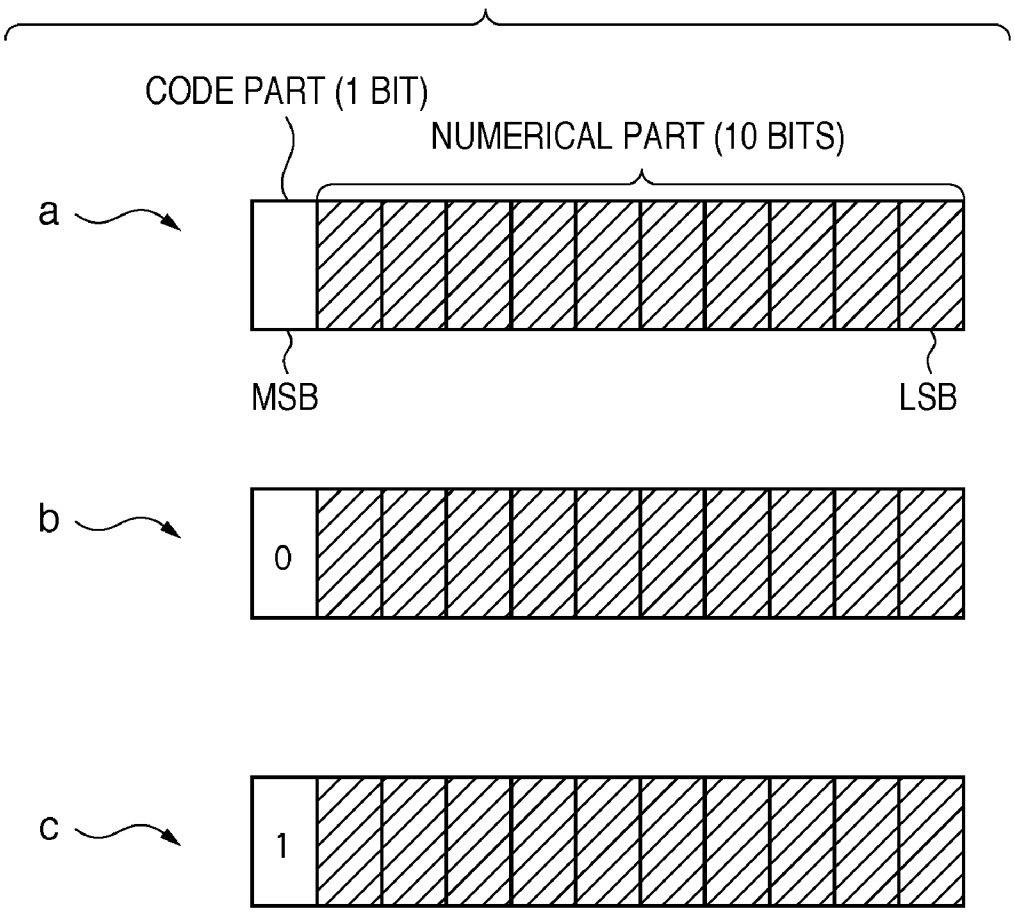
FIG. 5 is a conceptual view showing the structure of error data.

FIG. 5 is a view showing the structure of error data.

In the embodiment, error data to be diffused to an adjacent line is represented by 11 bits including a 1-bit positive/negative code part for each ink color component, as shown in a of FIG. 5. A negative number is represented by a two's complement. The MSB of positive error data is "0" as shown in b of FIG. 5, and that of negative error data is "1" as shown in c of FIG. 5.

Referring back to FIG. 4, the image processor 103 will be explained again.

The register unit 205 is formed from a group of registers including an image process startup register for designating the start of an image process, and a command parameter register for designating the contents and parameters of an image process to be executed. The register unit 205 includes a register for setting parameters associated with a compression process and decompression process.

The image data read-out DMAC 206 is a DMAC for reading out input image data stored in the RAM 115. The image data write DMAC 207 is a DMAC for storing, in the RAM 115, binary image data generated by performing a quantization process for input image data.

The error data read-out DMAC 208 is a DMAC for reading out, from the error memory, error data diffused from an adjacent line. The error data write DMAC 209 is a DMAC for storing, in the error memory, error data to be diffused to an adjacent line. In the embodiment, the error memory is formed as part of the RAM 115.

The operation of the quantization unit 202 will be explained in detail.

The quantization unit 202 reads out error data diffused from a preceding line, and adds it to image data of a pixel of interest that has been output from the color conversion unit 201. The error data diffused from a preceding line has been compressed by the error data compression unit 203 and stored in the RAM 115. The error data decompression unit 204 decompresses the error data read out from the RAM 115, restoring original diffused error data. The original diffused error data is sent to the quantization unit 202. An error diffused from a processed pixel on the same line as that of the pixel of interest is also added to the pixel of interest. The error diffused from the same line is temporarily stored in the internal buffer (not shown) of the quantization unit 202. After the errors from the same and preceding lines are diffused, the resultant data of each color component is compared with a threshold and quantized. The image data write DMAC 207 stores the output data in the RAM 115.

Figure 6:
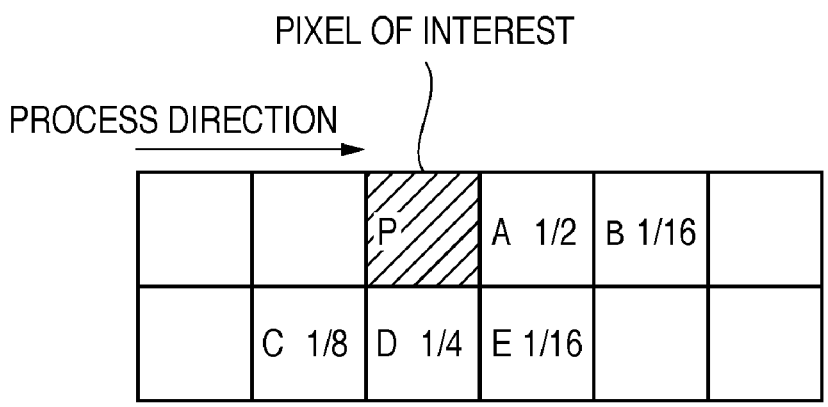
FIG. 6 is a view showing an error diffusion matrix.

FIG. 6 is a view showing an error diffusion matrix used in the error diffusion process. In FIG. 6, a pixel "P" is a pixel of interest.

A quantization error generated in a quantization process is diffused to unprocessed neighboring pixels in accordance with diffusion coefficients shown in FIG. 6. Errors "A" and "B" diffused to the same line as that of the pixel "P" in FIG. 6 are saved in the internal buffer (not shown) of the quantization unit 202. Errors "C", "D", and "E" diffused to an adjacent line in FIG. 6 are temporarily stored in the internal buffer of the quantization unit 202. Then, all errors to be diffused to a single pixel are added. The error data compression unit 203 compresses the added diffused error, and the RAM 115 stores the compressed diffused error via the error data write DMAC 209.

Figure 7:
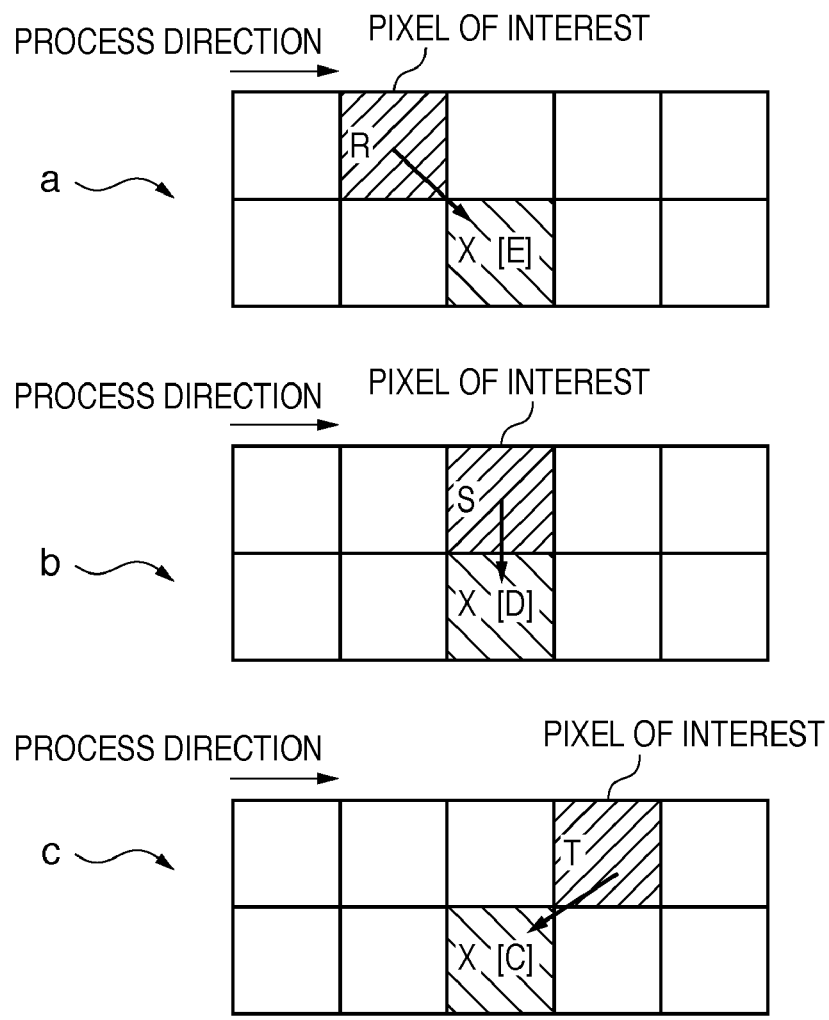
FIG. 7 is a conceptual view showing an error accumulation method.

FIG. 7 is a view schematically showing an error diffusion state.

In FIG. 7, an error diffused to a pixel "X" is the sum of three diffused errors: an error diffused from a pixel "R" of interest in a of FIG. 7 to a pixel having the diffusion coefficient "E" shown in FIG. 6, an error diffused from a pixel "S" of interest in b of FIG. 7 to a pixel having the diffusion coefficient "D", and an error diffused from a pixel "T" of interest in c of FIG. 7 to a pixel having the diffusion coefficient "C".

When the CPU 102 designates the start of an image process in response to write in the register unit 205, the image processor 103 sequentially reads out image data for one line stored in the RAM 115 from a pixel at one end to that at the other end, and performs the above-described color conversion process and quantization process. After the end of processing the line, the image processor 103 issues an interrupt to notify the CPU 102 of the completion of the process. The image processor 103 executes the same process for arrayed pixels adjacent in the sub-scanning direction in accordance with an instruction from the CPU 102, thereby binarizing the entire image data. The binary output image data are sequentially stored in the RAM 115, and then sent to the printer engine 118 via the printer engine interface 104 to print on a printing medium.

Figure 8:
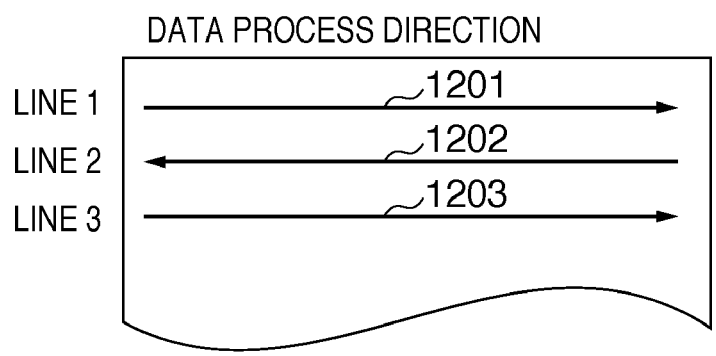
FIG. 8 is a conceptual view showing the image data process direction.

FIG. 8 is a view showing the image data process direction of the printing apparatus according to the embodiment.

In the embodiment, the image data process is performed for each line in the order of LINE1 1201, LINE2 1202, and LINE3 1203 of an image. The image process of LINE1 1201 proceeds in the direction of an arrow, that is, from left to right (first direction). Similarly, the image process of LINE2 1202 proceeds from right to left (second direction), and that of LINE3 1203 proceeds from left to right. The process of LINE1 starts after the image process direction of the next line (LINE2) is determined. Similarly, the image process of LINE2 starts after the process direction of LINE3 is determined.

The operation of the printing apparatus according to the embodiment of the present invention will be explained in detail with reference to FIG. 9.

Figure 9:
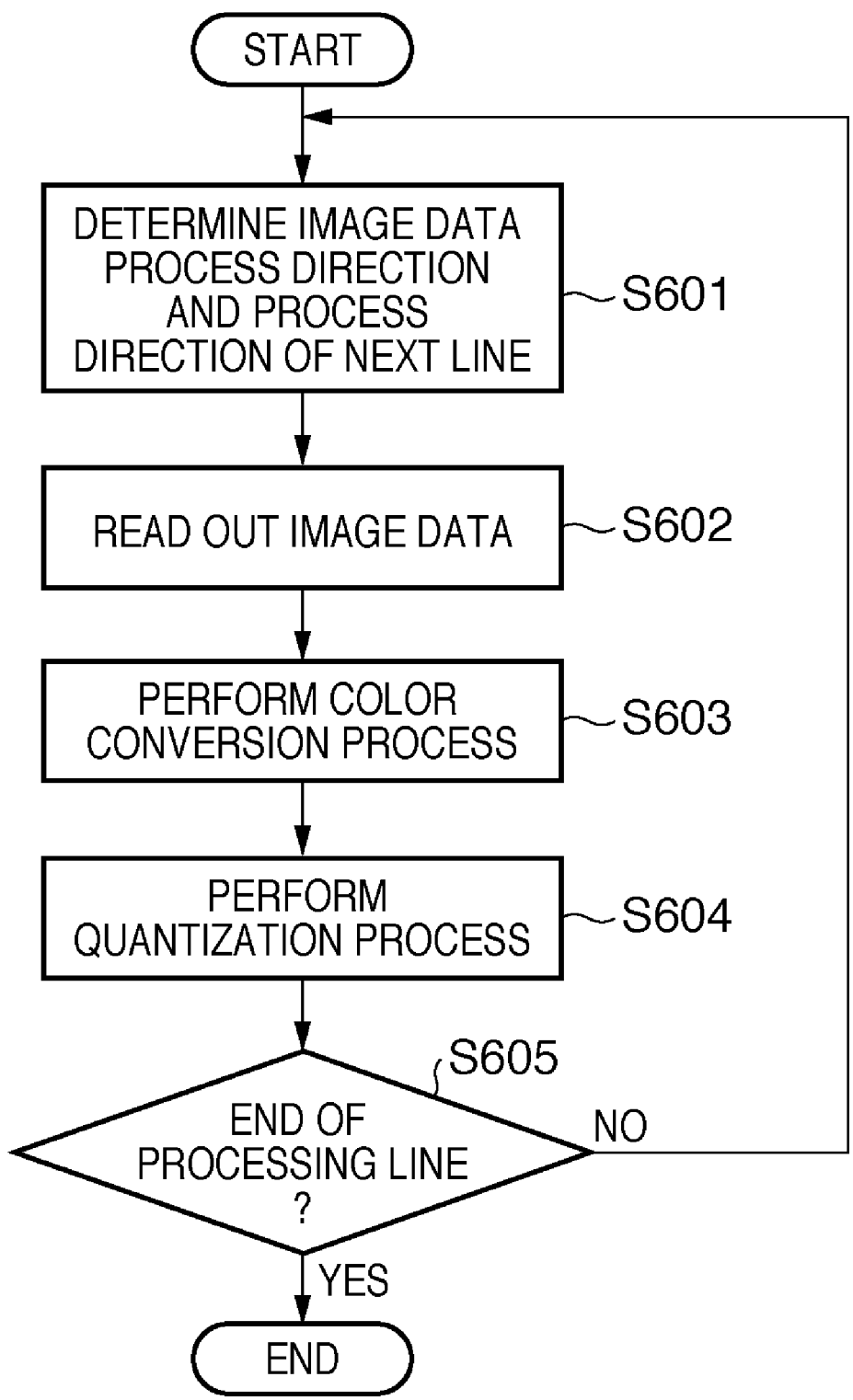
FIG. 9 is a flowchart showing an outline of an image data process.

FIG. 9 is a flowchart showing the operation sequence of the image processor when the printing apparatus quantizes image data. When the image processor 103 is instructed to execute a quantization process, it performs an image process operation according to the sequence shown in FIG. 9, achieving the quantization process.

More specifically, in step S601, the image processor 103 acquires, from an operation mode register, information on the data process direction of a line to undergo an image process and the process direction of the next line.

In step S602, the image processor 103 reads out image data of a pixel of interest from the RAM 115 via the image data read-out DMAC 206.

In step S603, the image processor 103 causes the color conversion unit 201 to convert a pixel of interest into image data represented by ink colors.

In step S604, the image processor 103 quantizes image data of the pixel of interest by the error diffusion method for each of the C, M, Y, K, LC, and LM color components. Details of processes associated with the quantization process in this step will be described later with reference to the drawing.

In step S605, the image processor 103 determines whether or not the image process of one line has ended. If an unprocessed pixel remains, the process returns to step S601. If all the pixels of one line have been processed, the process ends.

The quantization process sequence in step S604 will be explained in detail with reference to FIG. 10.

Figure 10:
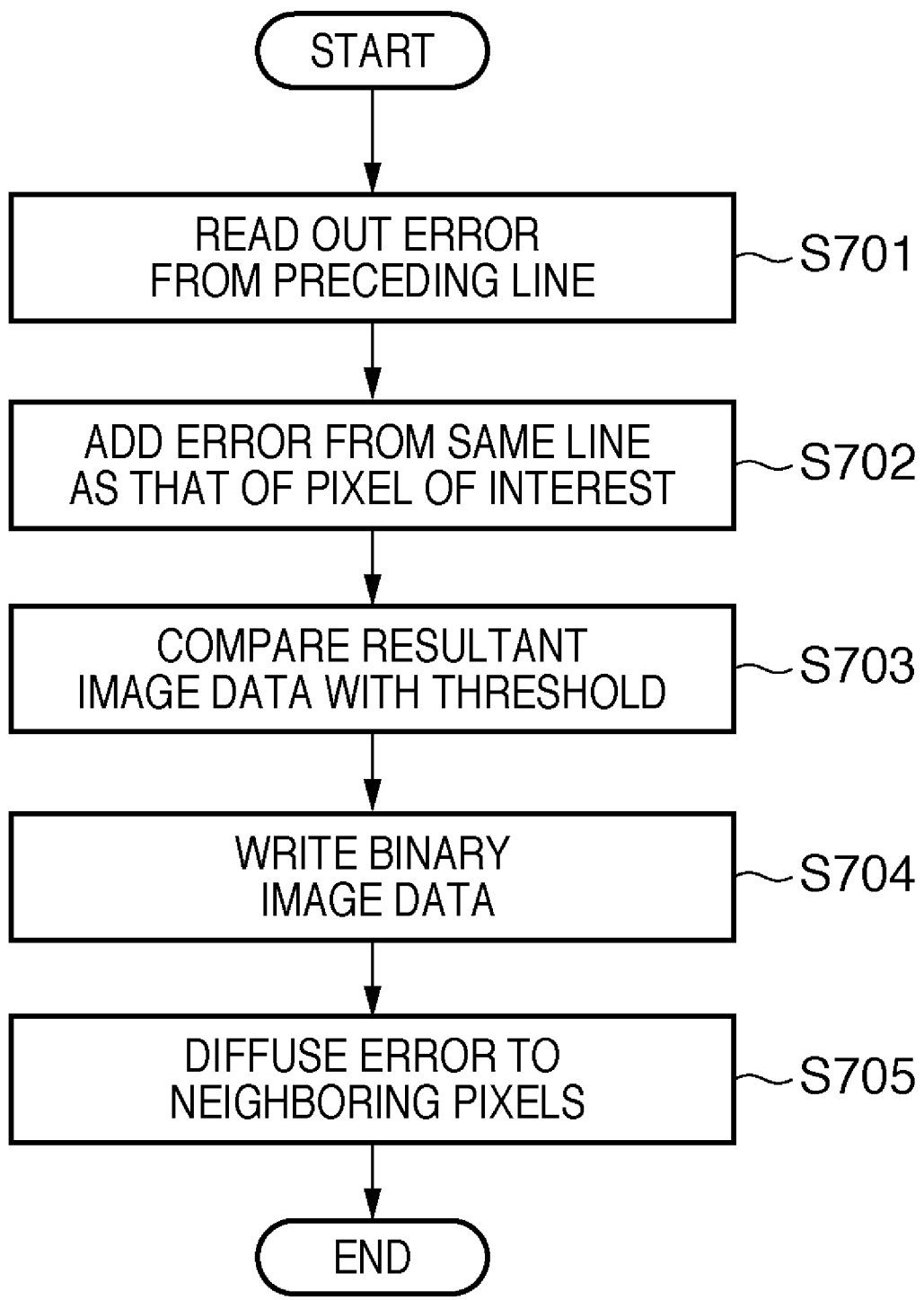
FIG. 10 is a flowchart showing the detailed sequence of an error diffusion process.

FIG. 10 is a flowchart showing the detailed sequence of the quantization process.

In step S701 of the quantization process, the image processor 103 reads out, via the error data read-out DMAC 208, an error diffused from a preceding line that has been compressed and stored in the RAM 115. The image processor 103 causes the error data decompression unit 204 to decompress the read-out error data, and adds the decompressed error data to image data.

In step S702, the image processor 103 adds, to the image data, an error diffused from the same line as that of the pixel of interest that has been stored in the internal buffer of the quantization unit 202.

In step S703, the image processor 103 compares, with a threshold stored in a register (not shown), the image data containing the quantization errors diffused from neighboring pixels (image data containing the errors diffused from neighboring pixels). Then, the image processor 103 generates binary image data.

In step S704, the image processor 103 writes the generated binary image data in the RAM 115 via the image data write DMAC 207.

Finally in step S705, the image processor 103 diffuses a generated quantization error to unquantized neighboring pixels in accordance with diffusion coefficients shown in FIG. 6. After that, the process ends. Of quantization errors diffused in this step, an error to be diffused to the same line as that of the pixel of interest is stored in the internal buffer of the quantization unit 202. An error to be diffused to an adjacent line is temporarily stored in the buffer. After adding all errors to be diffused to predetermined pixels, the error data compression unit 203 compresses the added error data, and the RAM 115 stores the compressed error data via the error data write DMAC 209.

Two embodiments regarding handling of error diffusion data in an image data process executed by the printing apparatus having the foregoing arrangement will be explained.

[First Embodiment]

Figure 11:
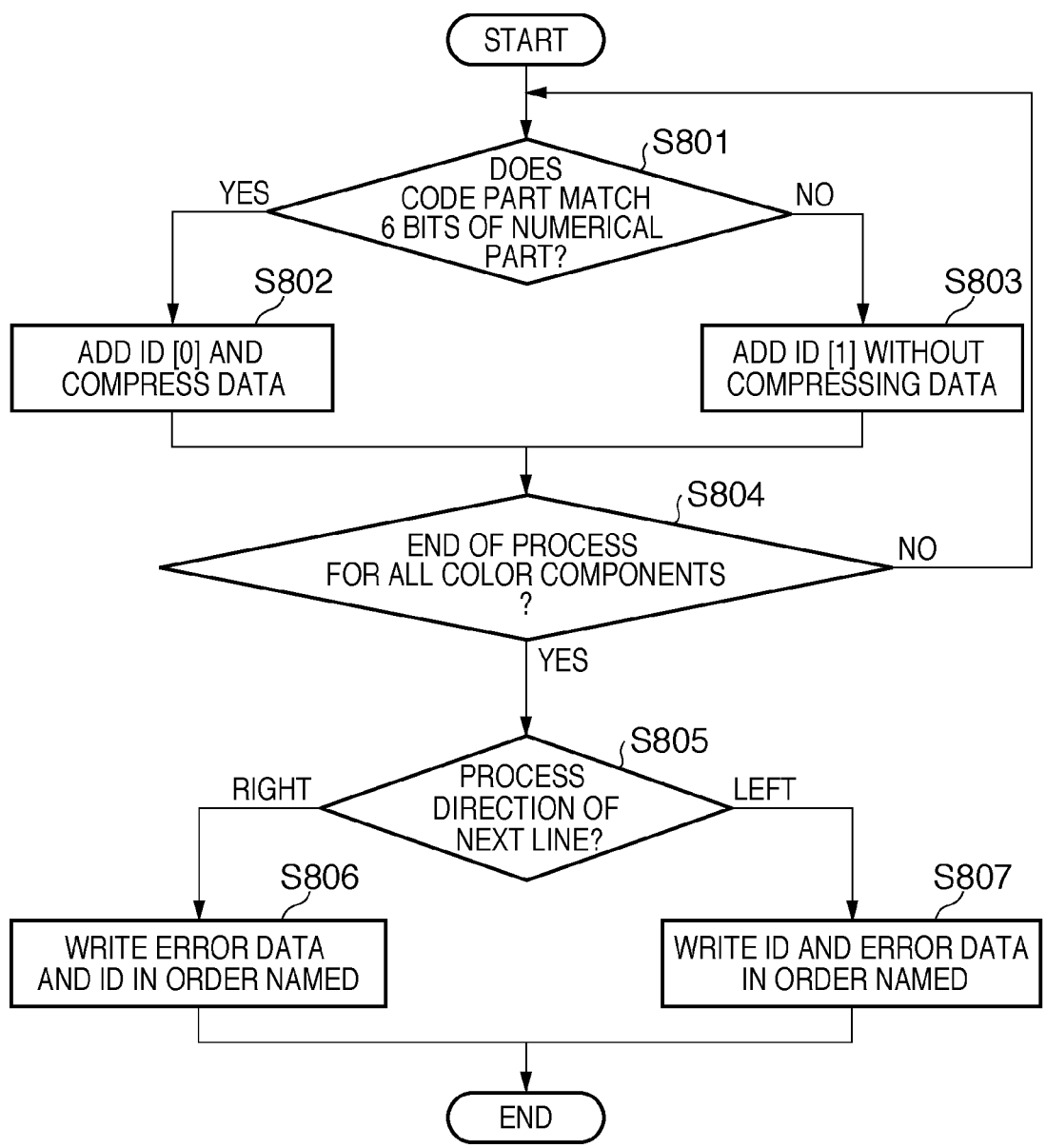
FIG. 11 is a flowchart showing an error data compression process according to the first embodiment of the present invention.

FIG. 11 is a flowchart showing the operation sequence of an error data compression unit 203.

In step S801, the error data compression unit 203 determines whether or not the value (0 or 1) of the code part of diffused error data received from a quantization unit 202 matches the value (0 or 1) of each of upper 6 bits of the numerical part. If the value of the code part matches that of each of upper 6 bits of the numerical part, the process advances to step S802; if they do not match each other, to step S803. The upper bit values of the numerical part to be compared with the value of the code part are set in the register (not shown) of a register unit 205.

If the error data compression unit 203 determines that the value of the code part matches that of each of upper 6 bits of the numerical part, it compresses error data in step S802 by concatenating an identifier (ID) "0" to the code part and lower 4 bits of the numerical part in the error data. Then, the process advances to step S804. If the error data compression unit 203 determines that the code part does not match upper 6 bits of the numerical part, it concatenates an identifier "1" to the code part and 10-bit numerical part in step S803. Then, the process advances to step S804.

In step S804, the error data compression unit 203 determines whether or not the compression process has ended for all the C, M, Y, K, LC, and LM color components. If data of an unprocessed color component remains, the process returns to step S801. If the compression process has ended for data of all the color components, the process advances to step S805.

In step S805, the error data compression unit 203 determines whether the process direction of the next line that has been designated in step S601 is from right to left, or from left to right. If the process direction is from left to right, that is, the first direction, the process advances to step S806. If the process direction is from right to left, that is, the second direction opposite to the first one, the process advances to step S807.

In step S806, the error data compression unit 203 concatenates compressed error data of all the color components in the order of the identifier and error data, and stores the resultant data in a RAM 115 via an error data write DMAC 209. Then, the process ends.

In step S807, the error data compression unit 203 concatenates compressed error data of all the color components in the order of the error data and identifier, and stores the resultant data in the RAM 115 via the error data write DMAC 209. Thereafter, the process ends.

This process can compress error data.

Figure 12:
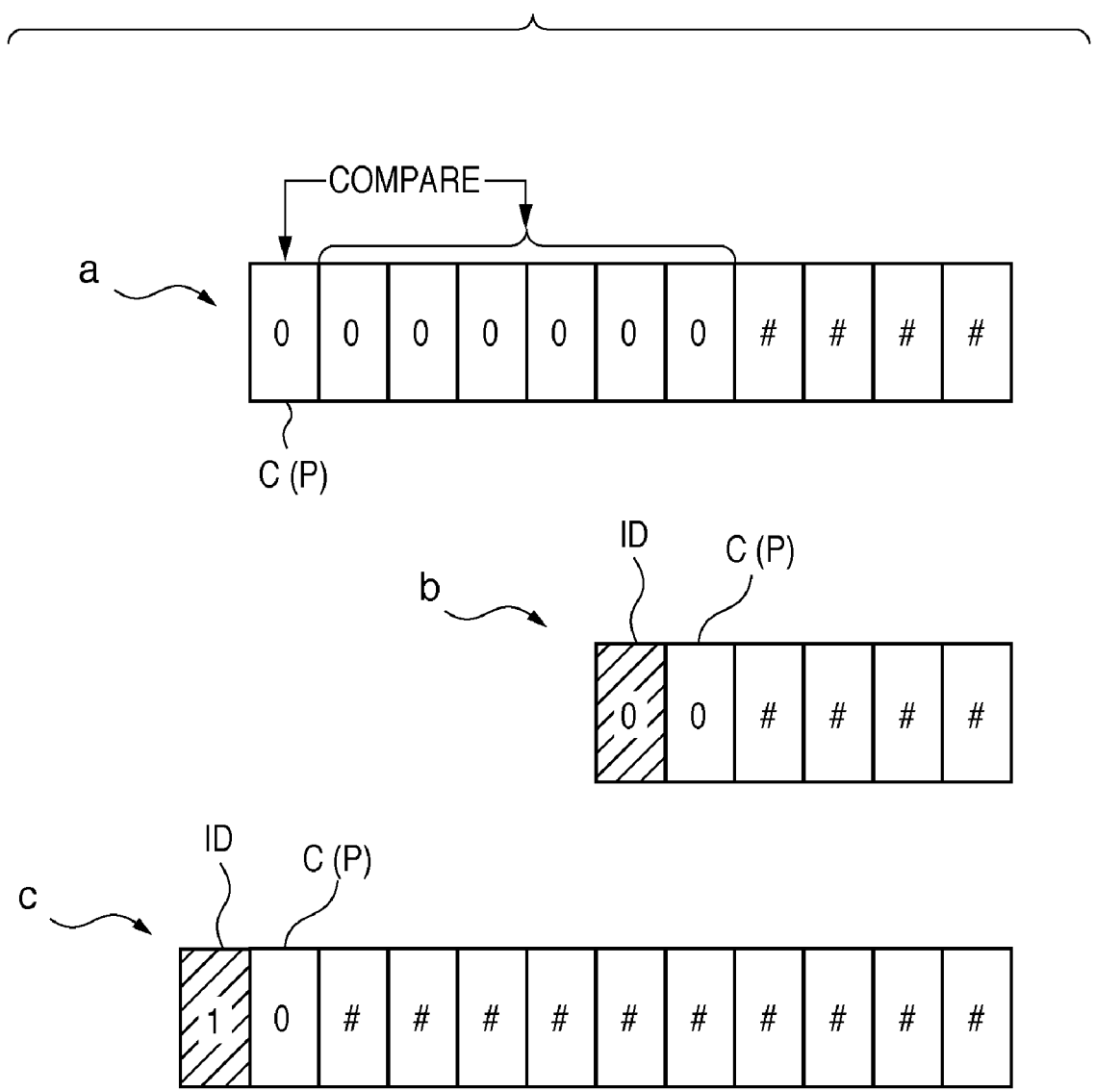
FIG. 12 is a conceptual view showing the compression format of error data according to the first embodiment of the present invention.
Figure 13:
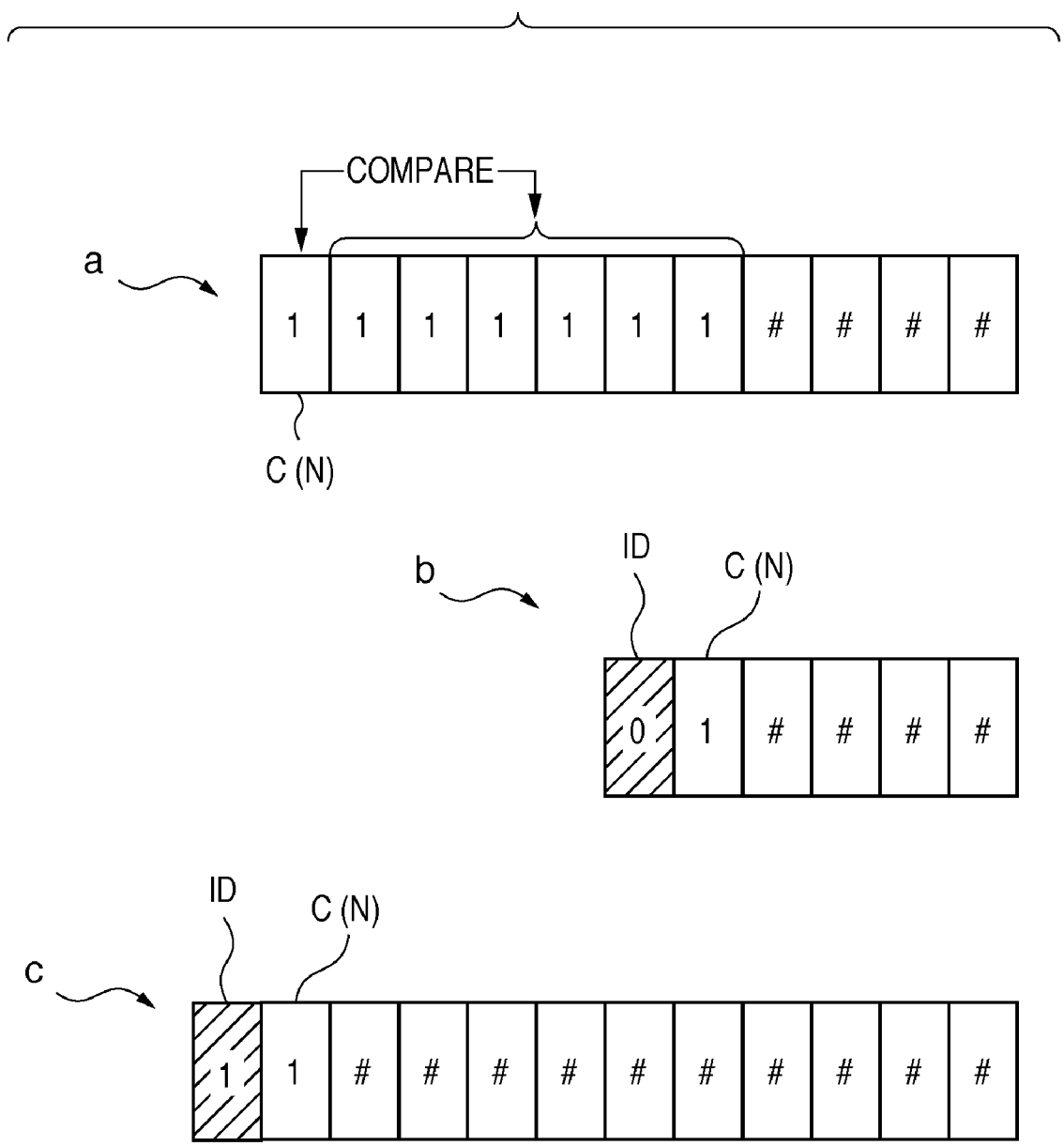
FIG. 13 is a conceptual view showing the compression format of error data according to the first embodiment of the present invention.

FIGS. 12 and 13 are views showing examples of error data.

For example, positive (P) error data C(P), the code part C of which is "0" and upper 6 bits of the numerical part of which are "000000", as shown in a of FIG. 12, is converted into 6-bit data by adding an identifier "0" to the code part "0" and lower 4 bits of the numerical part, as shown in b of FIG. 12.

Similarly, negative (N) error data C(N), the code part of which is "1" and upper 6 bits of the numerical part of which are "111111", as shown in a of FIG. 13, is converted into 6-bit data by adding an identifier "0" to the code part "1" and lower 4 bits of the numerical part, as shown in b of FIG. 13.

To the contrary, if the code part does not match upper 6 bits of the numerical part, the error data is converted into 12-bit data by concatenating an identifier "1" to original error data, as shown in c of FIG. 12 and c of FIG. 13. Hence, when the absolute value of error data is smaller than 16, original 11-bit error data can be compressed into 6-bit data, reducing access to the RAM 115.

Figure 14:
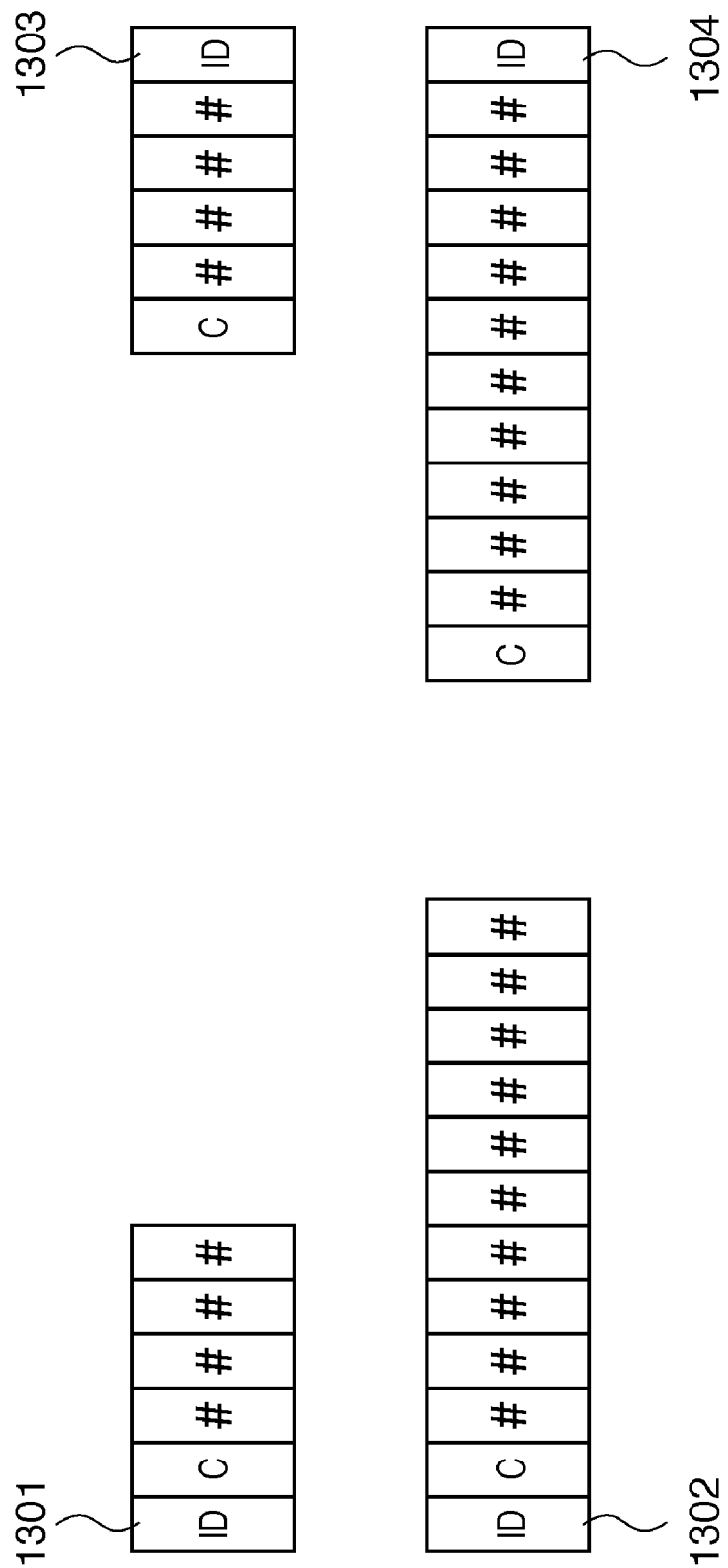
FIG. 14 is a conceptual view showing concatenation of an identifier and data according to the first embodiment of the present invention.

FIG. 14 is a view showing the data organization of compressed data and that of non-compressed data.

The writing sequence of the identifier (ID) and error data in steps S806 and S807 will be explained in detail with reference to FIGS. 8 and 14.

A case in which the data process direction changes between lines as shown in FIG. 8 will be exemplified. Upon storing, in a memory, error data generated in a data process for LINE1 1201, step S807 is executed because the data process direction of LINE2 1202 which is an adjacent unprocessed line is from right to left. Thus, error data and an identifier are concatenated in the order named as denoted by 1303 in FIG. 14 when data is compressed or 1304 in FIG. 14 when no data is compressed. The memory stores the error data whose data organization has been changed in this way.

Upon storing error data in the memory in a data process for LINE2 1202, step S806 is executed because the data process direction of LINE3 1203 which is an adjacent unprocessed line is from left to right. Thus, an identifier and error data are concatenated in the order named as denoted by 1301 in FIG. 14 when data is compressed or 1302 in FIG. 14 when no data is compressed. The memory stores the error data whose data organization has been changed in this fashion. Note that, as indicated in FIG. 14, in S806 and S807 of FIG. 11, the bits of error data (the bit of the positive/negative code part of error data and the bits of compressed or non-compressed error data) are not swapped.

Figure 15:
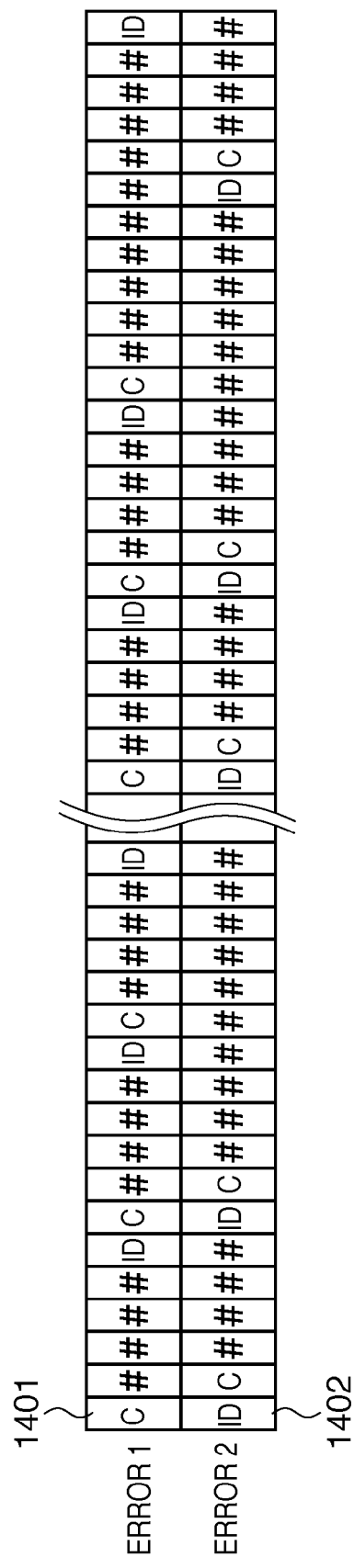
FIG. 15 is a view schematically showing storage of error data in a memory according to the first embodiment of the present invention.

FIG. 15 is a view schematically showing storage of compressed error data shown in FIG. 14 in the memory.

Referring to FIG. 15, ERROR 1 is an error data group generated on LINE1 1201 in FIG. 8. ERROR 2 is an error data group generated on LINE2 1202 in FIG. 8. Data of ERROR1 are stored from left to right similarly to the process direction of LINE1 1201. Also, data of ERROR2 are stored from right to left similarly to the process direction of LINE2 1202.

A sequence to decompress compressed diffused error data by an error data decompression unit will be explained in detail.

FIG. 16 is a flowchart showing the operation sequence of an error data decompression unit 204.

In step S1101, the error data decompression unit 204 determines whether or not the 1-bit identifier at the start of compressed error data which has been read out from a RAM via an error data read-out DMAC 208 in the same direction as the data process direction is "0". If the identifier is "0", the process advances to step S1102. If the identifier is "1", the process advances to step S1103. The direction to read out error data from the RAM 115 is from right to left to read out ERROR1 in FIG. 15 when the quantization unit 202 processes LINE2 in FIG. 8, and from left to right to read out ERROR2 in FIG. 15 when the quantization unit 202 processes LINE3 in FIG. 8.

In step S1102, the error data decompression unit 204 decompresses error data having a 4-bit numerical part subsequent to the identifier into one having a 10-bit numerical part. This process restores compressed error data shown in b of FIG. 12 and b of FIG. 13 into original error data having 10-bit numerical parts shown in a of FIG. 12 and a of FIG. 13.

If the identifier is "1", the error data decompression unit 204 removes the 1-bit identifier at the start to restore 11-bit error data in step S1103. This process removes identifiers from data shown in c of FIG. 12 and c of FIG. 13, restoring error data each formed from a code part and 10-bit numerical part.

In step S1104, the error data decompression unit 204 determines whether or not the decompression process has ended for data of all the C, M, Y, K, LC, and LM color components. If an unprocessed color component remains, the process returns to step S1101. If the decompression process has ended for all the color components, the process advances to step S1105.

In step S1105, the error data decompression unit 204 transfers the decompressed error data of all the color components to the quantization unit 202. Then, the process ends.

According to the first embodiment, when the absolute value of error data is smaller than 16, original 11-bit error data is compressed into 6-bit data to store the compressed error data. The embodiment can reduce the data amount and decrease access to the RAM 115.

[Second Embodiment]

An embodiment when the printing apparatus adopts two compression methods will be explained.

Figure 17:
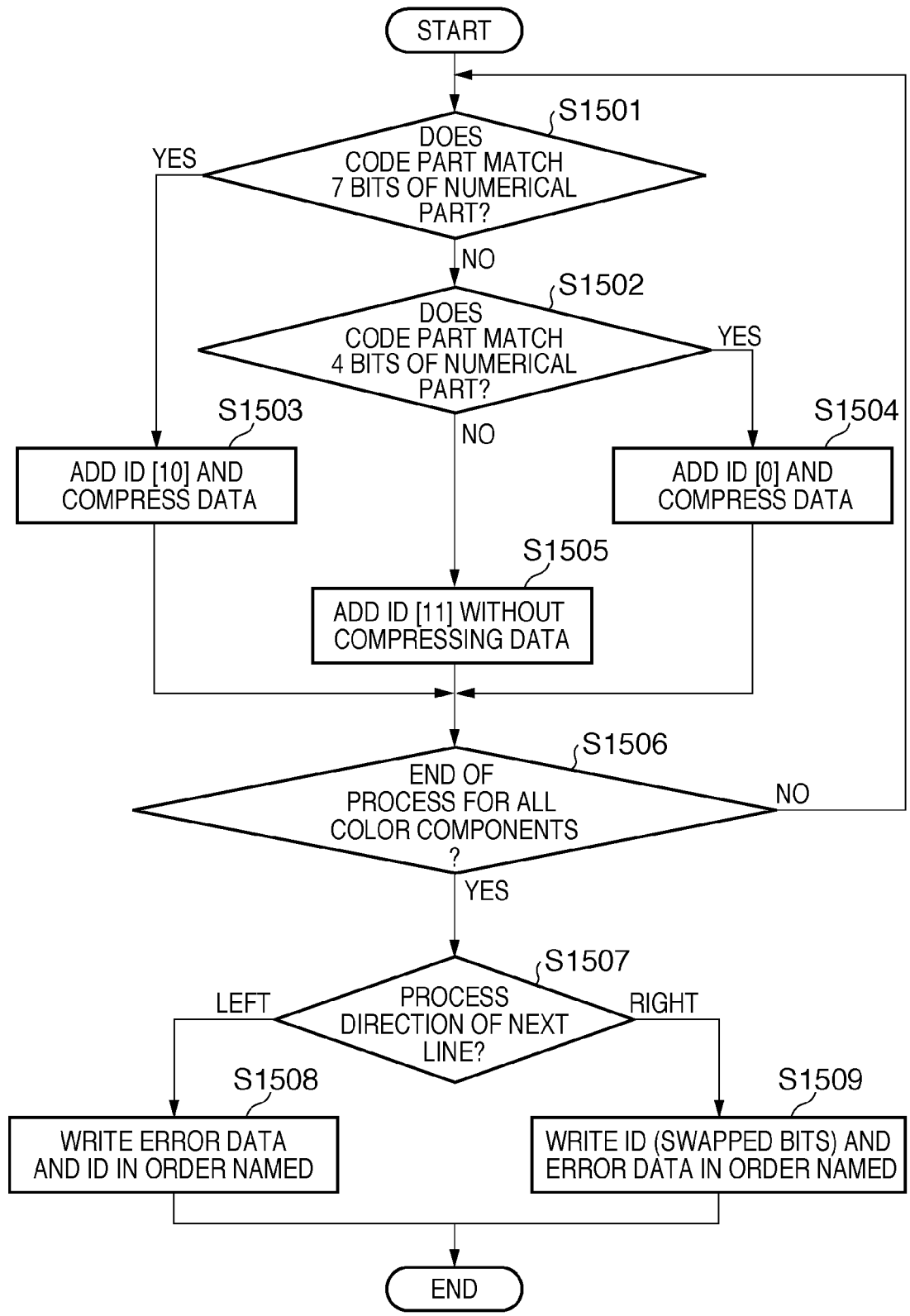
FIG. 17 is a flowchart showing an error data compression process according to the second embodiment of the present invention.

FIG. 17 is a flowchart showing the operation sequence of an error data compression unit 203.

In step S1501, the error data compression unit 203 determines whether or not the value (0 or 1) of the code part of diffused error data received from a quantization unit 202 matches the value (0 or 1) of each of upper 7 bits of the numerical part. If the value of the code part matches that of each of upper 7 bits of the numerical part, the process advances to step S1503; if they do not match each other, to step S1502.

If the error data compression unit 203 determines that the value of the code part does not match that of each of upper 7 bits of the numerical part, it further determines in step S1502 whether or not the value of the code part of the error data matches that of each of upper 4 bits of the numerical part. If the value of the code part matches that of each of upper 4 bits of the numerical part, the process advances to step S1504; if they do not match each other, to step S1505. The upper bit values of the numerical part to be compared with the value of the code part in steps S1501 and those of the numerical part to be compared with the value of the code part in step S1502 are set in different areas (not shown) of a register unit 205.

If the error data compression unit 203 determines in step S1501 that the value of the code part matches that of each of upper 7 bits of the numerical part, it compresses error data in step S1503 by concatenating an identifier "10" to the code part and lower 3 bits of the numerical part in the error data. Then, the process advances to step S1506. If the error data compression unit 203 determines in step S1502 that the value of the code part matches that of each of upper 4 bits of the numerical part, it compresses error data in step S1504 by concatenating an identifier "0" to the code part and lower 6 bits of the numerical part in the error data. Then, the process advances to step S1506.

If the error data compression unit 203 determines in step S1502 that the value of the code part does not match that of each of upper 4 bits of the numerical part, it concatenates an identifier "11" to the code part and 10-bit numerical part in step S1505. Then, the process advances to step S1506.

In step S1506, the error data compression unit 203 determines whether or not the compression process has ended for data of all the C, M, Y, K, LC, and LM color components. If data of an unprocessed color component remains, the process returns to step S1501. If the compression process has ended for all the color components, the process advances to step S1507.

In steps S1507 and S1508, the error data compression unit 203 concatenates compressed error data of all the color components similarly to the first embodiment, and stores the resultant data in a RAM 115 via an error data write DMAC 209. Then, the process ends. In step S1509, not only a single-digit identifier as in the first embodiment, but also a two-digit identifier is used. The error data compression unit 203 swaps bits in the identifier, unlike the first embodiment, concatenates them to error data, and stores the resultant data in the RAM 115 via the error data write DMAC 209. After that, the process ends. The processes in steps S1508 and S1509 are exclusive to each other. Either step S1508 or S1509 is selected in accordance with the result of determining in step S1507 whether the process direction of the next line is from right to left or from left to right.

This process can compress error data.

FIGS. 18 and 19 are conceptual views showing the compression format of error data according to the second embodiment.

Positive error data C(P), the code part of which is "0" and upper 7 bits of the numerical part of which are "0000000", as shown in a of FIG. 18, is converted into 6-bit data by adding an identifier "10" to the code part "0" and lower 3 bits of the numerical part, as shown in b-1 and b-2 of FIG. 18. b-1 in FIG. 18 represents the result of performing the process in step S1508, and b-2 in FIG. 18 represents that of performing the process in step S1509. d-1 and d-2 in FIG. 18, and e-1 and e-2 in FIG. 18 also have the same relationship as that between b-1 and b-2 in FIG. 18. In the following description, b-1 and b-2 in FIG. 18, d-1 and d-2 in FIG. 18, and e-1 and e-2 in FIG. 18 will be generically referred to as b in FIG. 18, d in FIG. 18, and e in FIG. 18.

Negative error data C(N), the code part of which is "1" and upper 7 bits of the numerical part of which are "1111111", as shown in a of FIG. 19, is converted into 6-bit data by adding an identifier "10" to the code part "1" and lower 3 bits of the numerical part, as shown in b-1 and b-2 of FIG. 19.

Error data including the code part of which is "0" and upper 4 bits of the numerical part of which are "0000", as shown in c of FIG. 18, is converted into 8-bit data by adding an identifier "0" to the code part and lower 6 bits of the numerical part, as shown in d-1 and d-2 of FIG. 18. Similarly, error data including the code part of which is "1" and upper 4 bits of the numerical part of which are "1111", as shown in c of FIG. 19, is converted into 8-bit data by adding an identifier "0" to the code part and lower 6 bits of the numerical part, as shown in d-1 and d-2 of FIG. 19.

When the code part matches neither upper 7 nor 4 bits of the numerical part, error data is converted into 13-bit data by concatenating an identifier "11" to original error data, as shown in e-1 and e-2 of FIG. 18 and e-1 and e-2 of FIG. 19.

According to the second embodiment, when the absolute value of error data is smaller than 8, original 11-bit error data is compressed into 6-bit data. When the absolute value of error data is equal to or larger than 8 and smaller than 64, the error data is compressed into 8-bit data. In this manner, the second embodiment compresses error data in accordance with the absolute value of the error data, and can reduce the data amount and decrease access to the RAM 115.

In the above-described embodiments, the identifier is a fixed value. However, the present invention is not limited to this, and is also applicable to an image processing apparatus using another identifier or an image processing apparatus capable of setting an arbitrary identifier.

The embodiments have explained a case where error data derived from binarizing multi-valued data by a quantization process is compressed. However, the present invention is not limited to this, and is also applicable to data to undergo an image process between adjacent lines.

The embodiments can achieve higher-density, higher-resolution printing using one of inkjet printing methods that adopts a means (e.g., electrothermal transducer) for generating heat energy to discharge ink and changes the ink state by the heat energy.

In addition, the inkjet printing apparatus according to the present invention is used as an image output terminal for an information processing apparatus such as a computer. The inkjet printing apparatus may also take the form of a copying machine combined with a reader, or a facsimile apparatus having a transmission/reception function.

The embodiments have described an embodiment of an inkjet printing apparatus as an image processing apparatus. However, the present invention is also applicable to an apparatus which is a digital television, or performs an image processing according to electrophotography.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-162405, filed Jun. 20, 2008, which is hereby incorporated by reference herein in its entirety.

What is claimed is:

1. An image processing apparatus which processes image data with a line format for each line comprising:
   compression means for compressing processed image data;
   determination means for determining whether a process direction of image data of a next line is a first direction or a second direction opposite to the first direction;
   change means for changing, in accordance with a determination result of said determination means, a data organization of the image data compressed by said compression means;
   a memory which stores the compressed image data whose data organization has been changed by said change means;
   decompression means for reading out the compressed image data stored in said memory and decompressing the compressed image data; and
   image processing means for performing an image process using the image data decompressed by said decompression means and image data of a line adjacent to a line of the processed image data,
   wherein said compression means concatenates, to image data, an identifier for identifying compressed data from non-compressed data, and
   wherein said change means swaps, in accordance with the determination result of said determination means, a position where the identifier is concatenated to the image data.

2. The apparatus according to claim 1, wherein said compression means uses a plurality of compression methods.

3. The apparatus according to claim 1, wherein the image data is multi-valued image data, the image process includes a binarization process to binarize the multi-valued image data in accordance with an error diffusion method, and said memory includes an error memory which stores error data generated by the binarization process.

4. The apparatus according to claim 3, wherein the binarization process uses image data of a plurality of adjacent lines.

5. A printing apparatus using an image processing apparatus according to claim 1, comprising an inkjet printhead which prints on a printing medium by discharging inks of a plurality of colors.

6. The apparatus according to claim 5, wherein the image data includes multi-valued color image data containing data of color components corresponding to the inks of the plurality of colors.

7. An image processing method of processing image data with a line format for each line comprising the steps of:
   compressing processed image data;
   determining whether a process direction of image data of a next line is a first direction or a second direction opposite to the first direction;
   changing, in accordance with a determination result of the determination step, a data organization of the image data compressed in the compression step;
   storing, in a memory, the compressed image data whose data organization has been changed in the change step;
   reading out the compressed image data stored in the memory and decompressing the compressed image data; and
   performing an image process using the image data decompressed in the decompression step and image data of a line adjacent to a line of the processed image data,
   wherein in the compressing step, an identifier for identifying compressed data from non-compressed data is concatenated to image data, and
   wherein in the changing step, in accordance with the determination result in the determining step, a position where the identifier is concatenated to the image data is swapped.

* * * * *